United States Patent Office 2,866,777
Patented Dec. 30, 1958

2,866,777

N-PYRIDYL THIAZOLESULFENAMIDE VULCANIZATION ACCELERATORS

Richard Leshin, Akron, Ohio, assignor to The Goodyear Tire & Rubber Company, Akron, Ohio, a corporation of Ohio No Drawing. Application August 4, 1955
Serial No. 526,563

13 Claims. (Cl. 260—79.5)

This invention relates to the vulcanization of rubber. More particularly this invention relates to new compounds which are valuable accelerators of the vulcanization of rubber.

It is an object of this invention to provide rapid vulcanization of rubber while resisting scorching. It is another object to provide improved compositions for vulcanizing rubber. It is another object to provide vulcanized rubber of improved quality. Other objects will appear hereinafter as the description of the invention proceeds.

According to this invention the acceleration of the vulcanization of rubber with sulfur can be produced by heating rubber and sulfur in the presence of an N-pyridyl thiazolesulfenamide.

The sulfenamides of this invention are the N-pyridyl thiazolesulfenamides. Various substituted N-pyridyl thiazolesulfenamides are comprehended as part of this invention. Thus included are the benzopyridyl compounds. In addition, the parent compounds can also contain various inert substituents such as alkyl, alkenyl, alkoxy, aryl, aralkyl and aryloxy groups. The 2-pyridyl thiazolesulfenamides and the methyl-2-pyridyl thiazolesulfenamides constitute the preferred compounds.

The pyridyl thiazolesulfenamides of this invention are readily prepared by reacting a thiazolesulfenamide having an unsubstituted amide (—$NH_2$) group with an amino-pyridine compound as illustrated in Example 1 below.

EXAMPLE 1

Eighteen and five-tenths grams of 2-benzothiazolesulfenamide and 31 grams of 2-aminopyridine were placed in a 250-milliliter sidearm suction flask, equipped with a thermometer. The thermometer was positioned so that its bulb extended into the mixture of sulfenamide and 2-aminopyridine. The flask was heated by means of a hot water bath and the pressure inside the flask was reduced to about 20 millimeters of mercury pressure by applying a vacuum to the sidearm. As the mixture warmed up it liquefied and foaming started. After the mixture had been heated for about 25 minutes its temperature had risen to 70 to 75° C. and foaming had almost stopped. Heating was stopped. The mixture was allowed to cool to room temperature and the pressure was raised to atmospheric pressure. The mixture was allowed to stand over night at room temperature and was then extracted with warm alcohol and filtered. The filtrate was diluted with water and the tan precipitate which formed was filtered, washed with water, and dried. Fifteen grams of product were obtained which, after recrystallization and drying, melted at 134–136° C.

The efficacy of the compounds of the invention in the vulcanization of rubber is illustrated by the following examples in which representative compounds were used in natural and synthetic rubber as vulcanization accelerators in comparison with N-oxydiethylene-2-benzothiazolesulfenamide and N-cyclohexyl-2-benzothiazolesulfenamide, both of which are commercial accelerators. In the examples the rubber stocks having the compositions indicated in Examples 2 and 3 were compounded on a laboratory rubber mill and vulcanized to give the results shown in Tables 1 and 2. The proportions of the ingredients of the rubber compounds are in parts by weight.

EXAMPLE 2

| Compound | A | B | C | D |
|---|---|---|---|---|
| Smoked Sheets | 100.0 | 100.0 | 100.0 | 100.0 |
| HAF Carbon Black | 50.0 | 50.0 | 50.0 | 50.0 |
| Stearic Acid | 3.0 | 3.0 | 3.0 | 3.0 |
| Zinc Oxide | 3.0 | 3.0 | 3.0 | 3.0 |
| Sulfur | 2.5 | 2.5 | 2.5 | 2.5 |
| Plasticizer | 5.0 | 5.0 | 5.0 | 5.0 |
| Antioxidant | 1.0 | 1.0 | 1.0 | 1.0 |
| N-oxydiethylene-2-benzothiazole-sulfenamide | .45 | | | |
| N-(2'-pyridyl)-2-benzothiazole-sulfenamide | | .5 | | |
| N-[2'-(3'-methylpyridyl)]-2-benzothiazolesulfenamide | | | .5 | |
| N-[2'-(4'-methylpyridyl)]-2-benzothiazolesulfenamide | | | | .5 |

Table 1

| Cure in Minutes at 275° F. | Ultimate Tensile Strength in Pounds Per Square Inch | | | |
|---|---|---|---|---|
| | A | B | C | D |
| 15 | 900 | 1,460 | 2,140 | 2,100 |
| 30 | 3,560 | 3,600 | 3,650 | 3,510 |
| 45 | 3,760 | 3,670 | 3,700 | 3,760 |
| 60 | 3,820 | 3,760 | 3,750 | 3,710 |
| 90 | 3,640 | 3,580 | 3,700 | 3,560 |

| | Ultimate Elongation in Percent | | | |
|---|---|---|---|---|
| 15 | 480 | 520 | 530 | 520 |
| 30 | 570 | 580 | 570 | 540 |
| 45 | 560 | 530 | 530 | 520 |
| 60 | 530 | 520 | 510 | 510 |
| 90 | 500 | 470 | 500 | 470 |

| | Modulus at 300% Elongation | | | |
|---|---|---|---|---|
| 15 | 360 | 525 | 825 | 875 |
| 30 | 1,500 | 1,525 | 1,500 | 1,625 |
| 45 | 1,750 | 1,800 | 1,800 | 1,850 |
| 60 | 1,875 | 1,950 | 1,950 | 2,000 |
| 90 | 1,925 | 2,075 | 2,000 | 2,100 |

EXAMPLE 3

| Compound | E | F | G |
|---|---|---|---|
| GR-S | 100.0 | 100.0 | 100.0 |
| HAF Carbon Black | 50.0 | 50.0 | 50.0 |
| Zinc Oxide | 3.0 | 3.0 | 3.0 |
| Stearic Acid | 3.0 | 3.0 | 3.0 |
| Plasticizer | 5.0 | 5.0 | 5.0 |
| Sulfur | 1.75 | 1.75 | 1.75 |
| N-cyclohexyl-2-benzothiazole-sulfenamide | 1.0 | | |
| N-(2'-pyridyl)-2-benzothiazole-sulfenamide | | 1.0 | |
| N-[2'-(4'-methylpyridyl)]-2-benzothiazolesulfenamide | | | 1.0 |

Table 2

| Cure in Minutes at 275° F. | Ultimate Tensile Strength in Pounds Per Square Inch | | |
|---|---|---|---|
| | E | F | G |
| 15 | | | |
| 30 | 2,240 | 2,640 | 2,910 |
| 45 | 2,910 | 3,460 | 3,520 |
| 60 | 3,560 | 3,580 | 3,600 |
| 90 | 3,070 | 3,630 | 3,730 |

| | Ultimate Elongation in Percent | | |
|---|---|---|---|
| 15 | | | |
| 30 | 710 | 700 | 650 |
| 45 | 520 | 620 | 550 |
| 60 | 560 | 540 | 500 |
| 90 | 410 | 470 | 460 |

| | Modulus at 300% Elongation | | |
|---|---|---|---|
| 15 | | | |
| 30 | 675 | 900 | 1,100 |
| 45 | 1,350 | 1,475 | 1,675 |
| 60 | 1,675 | 1,825 | 1,950 |
| 90 | 2,050 | 2,200 | 2,275 |

The examples and tables above have illustrated the invention with respect to representative pyridyl-substituted thiazolesulfenamides. Other pyridyl-substituted thiazolesulfenamides can also be used, such as the N-(2'-pyridyl)-sulfenamides such as N-(2'-pyridyl)-2-thiazolesulfenamide; the N-[2'-(methylpyridyl)]-sulfenamides such as N-[2'-(3'-methylpyridyl)]-2-thiazolesulfenamide, N-[2'-(5'-methylpyridyl)]-2-benzothiazolesulfenamide and N-[2'-(6'-methylpyridyl)]-2-benzothiazolesulfenamide; and the N-benzo[b]pyridyl sulfenamides such as N-(2'-benzo[b]pyridyl)-2-benzothiazolesulfenamide, and N-(3'-benzo[b]pyridyl)-2-benzothiazolesulfenamide.

Various other pyridyl sulfenamides of the invention can be prepared by the method of Example 1 by proper selection of reactants. Representative examples of aminopyridines that can be used to prepare these materials are 2-aminopyridine, 3-aminopyridine, 4-aminopyridine, methyl-substituted isomers of 2-aminopyridine such as 3-methyl-2-aminopyridine, 4-methyl-2-aminopyridine, 5-methyl-2-aminopyridine, and 6-methyl-2-aminopyridine; 2-amino-benzo[b]pyridine (i. e. 2-aminoquinoline), 3-amino-benzo[b]pyridine (i. e. 3-aminoquinoline), 4-amino-benzo[b]pyridine (i. e. 4-aminoquinoline), 1-amino-benzo[c]pyridine (i. e. 1-aminoisoquinoline), 3 - amino - benzo[c]pyridine (i. e. 3 - aminoisoquinoline), and 4-amino-benzo[c]pyridine (i. e. 4-aminoisoquinoline), and alkyl-substituted derivatives of these amino-benzopyridines. The 2-aminopyridines constitute a preferred class.

Representative examples of thiazolesulfenamides that can be used are 2-thiazolesulfenamide
4,5-dimethyl-2-thiazolesulfenamide
4,5-diethyl-2-thiazolesulfenamide
4-methyl-2-thiazolesulfenamide
4-ethyl-2-thiazolesulfenamide
4-butyl-2-thiazolesulfenamide
4-phenyl-2-thiazolesulfenamide
5-ethyl-2-thiazolesulfenamide
2-benzothiazolesulfenamide
2-naphthothiazolesulfenamide
6-chloro-2-benzothiazolesulfenamide
4-ethoxy-2-benzothiazolesulfenamide
6-phenyl-2-benzothiazolesulfenamide
6-nitro-2-benzothiazolesulfenamide
4-methyl-2-benzothiazolesulfenamide
5-ethyl-2-benzothiazolesulfenamide
6-tertiary butyl-2-benzothiazolesulfenamide The 2-benzothiazolesulfenamides constitute a preferred class.

The invention has been illustrated in the above examples and tables with respect to natural rubber and GR-S synthetic rubber. Various other rubbers can be used, representative examples being polybutadiene, polyisoprene, the rubbery butadiene-acrylonitrile copolymers, butadiene-isobutylene copolymers, butadiene-styrene copolymers and various other rubbery copolymers of diene hydrocarbons with another monomer copolymerizable therewith.

The amount of accelerator and the curing conditions used in the examples are shown for purposes of illustration. The curing conditions can be varied over the usual range used in the sulfur vulcanization of rubber. The other compounding ingredients also can be varied, and other materials, such as pigments, plasticizers, extenders, oils and waxes, can also be incorporated in the compositions.

While certain representative embodiments and details have been shown for the purpose of illustrating the invention, it will be apparent to those skilled in this art that various changes and modifications may be made therein without departing from the spirit or scope of the invention.

I claim:

1. The method of treating a rubber selected from the group consisting of natural rubber, polybutadiene, polyisoprene and rubbery copolymers of diene hydrocarbons with another monomer copolymerizable therewith which comprises vulcanizing said rubber with sulfur in the presence of an N-pyridyl-2-thiazolesulfenamide.

2. The method according to claim 1 in which the pyridyl sulfenamide is an N-(2-pyridyl)-2-thiazolesulfenamide.

3. The method of treating a rubber selected from the group consisting of natural rubber, polybutadiene, polyisoprene and rubbery copolymers of diene hydrocarbons with another monomer copolymerizable therewith which comprises vulcanizing said rubber with sulfur in the presence of N-(2'-pyridyl)-2-benzothiazolesulfenamide.

4. The method of treating a rubber selected from the group consisting of natural rubber, polybutadiene, polyisoprene and rubbery copolymers of diene hydrocarbons with another monomer copolymerizable therewith which comprises vulcanizing said rubber with sulfur in the presence of N-(3'-benzo[b]pyridyl)-2-benzothiazolesulfenamide.

5. The method of treating a rubber selected from the group consisting of natural rubber, polybutadiene, polyisoprene and rubbery copolymers of diene hydrocarbons with another monomer copolymerizable therewith which comprises vulcanizing said rubber with sulfur in the presence of N-[2'-(3'-methylpyridyl)]-2-benzothiazolesulfenamide.

6. The method of treating a rubber selected from the group consisting of natural rubber, polybutadiene, polyisoprene and rubbery copolymers of diene hydrocarbons with another monomer copolymerizable therewith which comprises vulcanizing said rubber with sulfur in the presence of N-[2'(4'-methylpyridyl)]-2-benzothiazolesulfenamide.

7. Vulcanized rubber prepared by treating a rubber selected from the group consisting of natural rubber, polybutadiene, polyisoprene and rubbery copolymers of diene hydrocarbons with another monomer copolmerizable therewith with sulfur in the presence of an N-pyridyl-2-thiazolesulfenamide.

8. As a new compound an N-pyridyl-2-thiazolesulfenamide.

9. As a new compound an N-2'-pyridyl-2-thiazolesulfenamide.

10. As a new compound N-(2'-pyridyl)-2-benzothiazolesulfenamide.

11. As a new compound N-[2'-(3'-methylpyridyl)]-2-benzothiazolesulfenamide.

12. As a new compound N-[2'-(4'-methylpyridyl)]-2-benzothiazolesulfenamide.

13. A vulcanizable composition comprising a rubber selected from the group consisting of natural rubber, polybutadiene, polyisoprene and rubbery copolymers of diene hydrocarbons with another monomer copolmerizable therewith, sulfur and an N-pyridyl-2-thiazolesulfenamide.

References Cited in the file of this patent

UNITED STATES PATENTS

| | | |
|---|---|---|
| 2,417,989 | Moore | Mar. 25, 1947 |
| 2,419,283 | Paul | Apr. 22, 1947 |
| 2,419,294 | Skaptason | Apr. 22, 1947 |
| 2,461,953 | Bargmeyer | Feb. 15, 1949 |
| 2,476,818 | Carr | July 19, 1949 |
| 2,666,043 | Carr | Jan. 12, 1954 |
| 2,691,015 | Gregory | Oct. 5, 1954 |

OTHER REFERENCES

Carr: "Journal of Organic Chemistry," vol. 14, pages 921–934 (only page 927 relied upon) (1949).